United States Patent
Huang et al.

(10) Patent No.: US 8,771,571 B2
(45) Date of Patent: Jul. 8, 2014

(54) METHOD FOR PREPARING HIGH WATER-ABSORPTION AND ANTI-BACTERIAL GAMMA POLYGLUTAMIC ACID FIBERS

(75) Inventors: Jo-Wei Huang, Zhongli (TW); Chia-Chang Liu, Zhongli (TW); Ying-Nan Tsai, Zhongli (TW)

(73) Assignee: Far Eastern New Century Corporation, Taipei (TW)

( * ) Notice: Subject to any disclaimer, the term of this patent is extended or adjusted under 35 U.S.C. 154(b) by 781 days.

(21) Appl. No.: 13/051,236

(22) Filed: Mar. 18, 2011

(65) Prior Publication Data
US 2012/0083179 A1  Apr. 5, 2012

(30) Foreign Application Priority Data
Oct. 4, 2010 (TW) ............................... 99133713 A

(51) Int. Cl.
*D01D 1/02* (2006.01)
*D04H 13/00* (2006.01)
*C08G 69/08* (2006.01)
*C08G 69/10* (2006.01)

(52) U.S. Cl.
CPC .............. *C08G 69/08* (2013.01); *D04H 13/00* (2013.01); *C08G 69/10* (2013.01)
USPC .......... 264/184; 442/123; 442/414; 8/115.51; 428/364

(58) Field of Classification Search
CPC ........ C08G 69/10; C08G 69/08; C08G 61/12; D04H 13/00; B29B 9/06; D01D 1/02; D01D 5/06; D01D 5/00; D01F 6/68
USPC .......... 8/115.51; 264/176.1, 178 R, 183, 184, 264/178 F, 203; 428/357, 364, 365, 907; 442/123, 414
See application file for complete search history.

(56) References Cited

U.S. PATENT DOCUMENTS

| 4,572,906 A | 2/1986 | Sparkes et al. |
| 6,267,782 B1 | 7/2001 | Ogle et al. |
| 6,333,093 B1 | 12/2001 | Burrell et al. |
| 6,451,003 B1 | 9/2002 | Prosl et al. |
| 8,273,278 B2 * | 9/2012 | Huang et al. ................. 264/184 |
| 2008/0248705 A1 | 10/2008 | Li et al. |
| 2010/0256326 A1 | 10/2010 | Huang et al. |

FOREIGN PATENT DOCUMENTS

| CN | 101633722 A | 1/2010 |
| CN | 101871137 | 10/2010 |
| JP | 6322358 | 11/1994 |

OTHER PUBLICATIONS

English translation of the abstract of CN 101633722 A (published Jan. 27, 2010).
English translation of the abstract for JP 6322358 (published Nov. 22, 1994).
English translation of the abstract for CN 101871137 (published Oct. 27, 2010).

* cited by examiner

*Primary Examiner* — Arti Singh-Pandey
(74) *Attorney, Agent, or Firm* — McClure, Qualey & Rodack, LLP

(57) ABSTRACT

A method for preparing a polyglutamic acid (γ-PGA) fiber having antibacterial and water absorption properties is provided. The method includes providing a γ-PGA fiber and immersing it in a sodium hypochlorite solution. A relation exists between an immersing time T of the γ-PGA fiber and a concentration X of the sodium hypochlorite solution as shown in the formula below:

$$10.2 \leq (T - 64.55X^2 + 50X) \leq 15.2,$$

wherein X is 0.006-0.4 wt %.

7 Claims, No Drawings

METHOD FOR PREPARING HIGH WATER-ABSORPTION AND ANTI-BACTERIAL GAMMA POLYGLUTAMIC ACID FIBERS

RELATED APPLICATIONS

This application claims priority to Taiwan Application Serial Number 099133715, filed Oct. 4, 2010, which is herein incorporated by reference.

BACKGROUND

1. Field of Invention

The present invention relates to a method for preparing an anti-bacterial fiber. More particularly, the present invention relates to a method for preparing a γ-polyglutamic acid (γ-PGA) fiber having high water-absorption and antibacterial properties.

2. Description of Related Art

High water-absorption materials have water absorptivity, and can retain water of tens or hundreds folds of their own weight after absorption, thus having a quite wide application range. Conventionally used high water-absorption materials are mainly divided into two types. One is carbohydrate based, such as polysaccharides. The polysaccharides can be starch, chitosan, sodium alginate, and carboxymethyl cellulose (CMC), for example. These materials are natural materials, and have good biodegradability, but are limited in application due to limited water absorptivity (generally not higher than 10 folds). The other type is chemically synthesized polymers, such as polyacrylate or poly(vinyl alcohol). These materials have better water absorptivity than the above natural materials do. They also have some problems such as complicated preparation and potential release of toxic monomer and base residues. Furthermore, these chemically synthesized polymers are not biodegradable, and thus will cause hazard to environment after disposal. Therefore, in view of the environment protection requirement, the natural polysaccharide materials having poor water absorptivity are still generally selected to be used as the main water-absorption material.

Conventional high water-absorption materials are commonly prepared in a form of hydrogel or film. For example, Japanese Patent Publication No. 94-322358 discloses a method for cross-linking of a γ-PGA solution by a γ-ray cross-linking technology, to prepare a high water-absorption hydrogel. Furthermore, it is also mentioned in U.S. Pat. No. 4,572,906 that a water-absorption film dressing can be prepared with a mixture of chitosan and gelatin. However, the film and hydrogel disclosed in these technologies cannot provide a flow guiding function when they contact with a liquid. Because only the flat surfaces of the film and hydrogel can contact with the liquid, the overall water absorption rate is low. Thus, it results in limited application.

However, if a water-absorption material is fiberized, the contact area may be efficiently increased, thereby increasing the water absorption rate. Moreover, the structure of the fiber may further provide the flow guiding function, so as to increase the water absorption rate. U.S. application Ser. No. 12/757,288 discloses that natural γ-PGA can be spun out in a partially cross-linked form, to prepare γ-PGA fibers having high water absorptivity. By this technology, the problem of the low water absorption rate of the conventional natural water-absorption materials is fully solved.

The γ-PGA fibers above have good biodegradability. Thus, if a part of the material is decomposed while using, the whole structure of the fibers will be destroyed and disintegrated, so that the water absorptivity thereof is lowered. On the other hand, when a part of the material is decomposed, oilgopeptides or amino acid monomers may be formed. However, because these substances are nutrient sources of microorganisms, growth of microorganisms are easily caused. If such a fiber directly contacts with a human body, or is prepared into a dressing material for health care, infection with the organisms may occur. In order to prevent the occurrence of such a hazard, a sufficient antibacterial ability is required to introduce into this fiber.

In the prior art, an antibacterial treatment method of fibers is generally attaching an organic or an inorganic antibacterial material to fibers. The inorganic antibacterial material is generally a support containing metal ions (e.g., $Ag^+$, and $Zn^{2+}$), or metal nanoparticles (for example, silver nanoparticles). The inorganic antibacterial material above can release the metal ions or the metal nanoparticles above to bind cellular proteins of microorganisms to inactivate the microorganisms, thereby to achieve the antibacterial efficacy. The antibacterial effect is generally relatively long acting. However, a process for attaching the inorganic antibacterial material on the fibers is complicated and highly cost (as known from U.S. Pat. Nos. 6,333,093, 6,451,003, and 6,267,782), and there are also problems such as cytotoxicity and low releasing rate, and thus the overall antibacterial effect is limited. Furthermore, as for the organic antibacterial materials, a quaternary ammonium salt is commonly used as disinfectant and antibacterial agent of the fiber in the prior art, and also has the advantage of long-acting antibacterial effect. However, the quaternary ammonium salt has a poor thermal stability and cannot be used in a process of plastic or fiber spinning, thus having limitations in application.

Therefore, it is necessary to develop a preparation method having simple process and low production cost, to obtain a fiber having antibacterial property and high water absorptivity.

SUMMARY

In one aspect, the present invention mainly provides a γ-PGA fiber has high water absorptivity and antibacterial property and a preparation method thereof.

In another aspect, the present invention further provides a fabric prepared from the above γ-PGA fiber, which has high water absorptivity and antibacterial property.

In order to achieve the above aspects of the present invention, the method for preparing a γ-PGA fiber having antibacterial property and high water absorptivity includes immersing a γ-PGA fiber in a sodium hypochlorite solution. A relation between the immersing time T of the γ-PGA fiber and the concentration X of the sodium hypochlorite solution can be shown in the following Formula I:

$$10.2 \le (T - 64.55X^2 + 50X) \le 15.2 \quad \text{(I)}$$

wherein X is 0.006-0.4 wt %.

The fiber having high water absorptivity and antibacterial property can be easily prepared by the preparation method of the present invention. Moreover, the γ-PGA fiber prepared according to the method of the present invention has good antibacterial property while maintaining good water absorptivity. Therefore, no microorganism contamination problem needs to be worried while applying these γ-PGA fibers.

These and other features, aspects, and advantages of the present invention will become better understood with reference to the following description and appended claims. It is to be understood that both the foregoing general description and the following detailed description are by examples, and are intended to provide further explanation of the invention as claimed.

DETAILED DESCRIPTION

According to an embodiment of this invention, a method for preparing a γ-PGA fiber having antibacterial property and high water absorptivity is provided. The method includes immersing γ-PGA fibers in a sodium hypochlorite solution having a concentration X (wt %) for a pre-set period of time T (min). A relation exists between the immersing time T of the γ-PGA fibers and the concentration X of the sodium hypochlorite solution as shown in Formula I below:

$$10.2 \leq (T - 64.55X^2 + 50X) \leq 15.2 \quad (I)$$

wherein X=0.006-0.4 wt %.

According to the method above, when a calculated value of the formula $T-64.55X^2+50X$ is lower than 10.2, the antibacterial property of the prepared fiber may be insufficient. On the contrary, if a calculated value of the formula $T-64.55X^2+50X$ is greater than 15.2, although antibacterial property of the prepared fiber is sufficient, the fiber structure may be easily destroyed to lose its mechanical strength caused by the harsh treatment.

Furthermore, when the concentration X of sodium hypochlorite used to treat the γ-PGA fiber is lower than 0.006 wt %, the prepared fiber will easily have a problem of insufficient antibacterial property. On the contrary, when the concentration X of sodium hypochlorite used to treat the γ-PGA fiber is greater than 0.4 wt %, though the prepared fiber has a sufficient antibacterial property, the fiber structure may be easily destroyed to lose its mechanical strength caused by the harsh treatment.

The method for preparing the γ-PGA fibers useful in the present invention is not particularly limited, and may be, for example, the method for preparing γ-PGA fiber as disclosed in U.S. application Ser. No. 12/757,288, in which natural γ-PGA is spun out in a partially cross-linked form, to prepare a γ-PGA fiber having high water absorptivity. However, the present invention is not limited thereto. Disclosure in U.S. application Ser. No. 12/757,288 is entirely incorporated herein by reference.

The molecular weight of the γ-PGA useful in the present invention is not particularly limited, and is preferably in the range of 500 to 2,000,000, and more preferably in the range of 1,000 to 2,000,000 in view of the operation convenience.

Moreover, in the preparation method of the present invention, the sodium hypochlorite solution is strongly oxidative, in order to avoid chlorine release caused by severe reaction at high temperature, the temperature for chlorination with the sodium hypochlorite solution is preferably maintained below room temperature.

In chlorination with the sodium hypochlorite solution, in order to quickly react the γ-PGA fibers with sodium hypochlorite in the sodium hypochlorite solution, the sodium hypochlorite solution may be further agitated by an external force, such as magnetic stirring, shaking, stirring with a blade, or other available agitating ways. However, the present invention is not limited thereto.

In order to have a better effect for the preparation method above, the pH value of the sodium hypochlorite solution is preferably to be 6-8. When the pH value is greater than 8, the reaction rate of the γ-PGA fibers with sodium hypochlorite in the solution will be decreased to reduce the oxidation degree, and thus the antibacterial effect is unobvious. When the pH value is lower than 6, the reaction rate is increased, but the amide bond will be broken to decrease the molecular weight, thereby the structure of the γ-PGA fiber is destroyed.

In order to control the pH value of the sodium hypochlorite solution during reaction in a desired range, a pH buffer agent is preferably further added to the sodium hypochlorite solution, to adjust the pH value of the sodium hypochlorite solution.

The pH buffer agent useful in the present invention is not particularly limited, including, but not limited to, a phosphoric acid solution, an ammonium chloride solution, an acetic acid solution, a disodium hydrogen phosphate solution, a disodium hydrogen phosphate solution, a benzoic acid solution, or a mixture thereof.

The γ-PGA fiber having antibacterial property and water absorptivity disclosed in the present invention achieves the antibacterial efficacy by a halamine functional group. The halamine functional group of N—X (in which, X may be Cl, Br, or I) will interact with water molecules in the presence of microorganisms to release an oxidative halide ion in water. The halide ion can kill microorganisms such as bacteria and mold, and thus achieves the antibacterial efficacy.

It should be understood by persons skilled in the art through the description of the present invention that the γ-PGA fiber having antibacterial property and high water absorptivity above may be further prepared into a fabric, such as a non-woven fabric, by a conventional textile technology; however, the present invention is not limited thereto.

Hereinafter, several embodiments are enumerated to further describe the method of the present invention in detail. However, these embodiments are provided only for exemplification and description, and not intended to limit the present invention, and the protection scope of the present invention is defined by the accompanying claims.

Embodiments

Preparation of γ-PGA Fiber

γ-PGA sodium salt (VEDAN Enterprise Corp, Taiwan) was formulated in water to give a solution of 6 wt %. Then, ethylene glycol diglycidyl ether (TOKYO YASEI, Japan), as a cross-linking agent, was added into the formulated γ-PGA solution at an amount of 7 µL cross-linking agent/g γ-PGA solution, relative to per 100 g γ-PGA solution. After adding the cross-linking agent, the initial viscosity of the γ-PGA solution before the reaction of cross-linking was 56.4 cp.

Then, the above γ-PGA solution was cross-linked at 60° C. with stirring at a rate of 50 rpm, till the viscosity rose to 82 cp (at about 240 min), and then the solution was passed through a spin nozzle for being spun out. In order to prevent the continuous cross-linking of the γ-PGA solution before passing through the spin nozzle, the temperature of the γ-PGA solution was dropped to 6° C. to slow down the cross-linking rate. Fibers obtained by passing through the spin nozzle were introduced into isopropyl alcohol (model TG-078-000000-75NL, Echo Chemical Co. Ltd, Taiwan) as a coagulation solution, so as to be shaped. Then, the prepared γ-PGA fibers were collected, transferred to an oven at 60° C., and dried for about 20 hours to obtain the γ-PGA fibers.

Preparation of Modified γ-PGA Fiber

Embodiment 1:

The γ-PGA fibers were immersed in 0.4 wt % sodium hypochlorite solution at a pH of 6-8 adjusted by 0.5 N phosphoric acid solution for 40 seconds and then taken out. The fibers were rinsed with distilled water, and then put aside to be dried.

Embodiment 2:

The γ-PGA fibers were immersed in 0.3 wt % sodium hypochlorite solution at a pH of 6-8 adjusted by 0.5 N phosphoric acid solution for 1 minute and then taken out. The fibers were rinsed with distilled water, and then put aside to be dried.

Embodiment 3:

The γ-PGA fibers were immersed in 0.16 wt % sodium hypochlorite solution at a pH of 6-8 adjusted by 0.5 N phosphoric acid solution for 4 minutes and then taken out. The fibers were rinsed with distilled water, and then put aside to be dried.

Embodiment 4:

The γ-PGA fibers were immersed in 0.078 wt % sodium hypochlorite solution at a pH of 6-8 adjusted by 0.5 N phosphoric acid solution for 7 minutes and then taken out. The fibers were rinsed with distilled water, and then put aside to be dried.

Embodiment 5:

The γ-PGA fibers were immersed in 0.006 wt % sodium hypochlorite solution at a pH of 6-8 adjusted by 0.5 N phosphoric acid solution for 10 minutes and then taken out. The fibers were rinsed with distilled water, and then put aside to be dried.

Comparative Example 1:

The γ-PGA fibers were immersed in 0.005 wt % sodium hypochlorite solution at a pH of 6-8 adjusted by 0.5 N phosphoric acid solution for 10 minutes and then taken out. The fibers were rinsed with distilled water, and then put aside to be dried.

Comparative Example 2:

The γ-PGA fibers were immersed in 0.4 wt % sodium hypochlorite solution at a pH of 6-8 adjusted by 0.5 N phosphoric acid solution for 20 seconds and then taken out. The fibers were rinsed with distilled water, and then put aside to be dried.

Comparative Example 3:

The γ-PGA fibers were immersed in 0.16 wt % sodium hypochlorite solution at a pH of 6-8 adjusted by 0.5 N phosphoric acid solution for 20 minutes and then taken out. Then, it was found that the structure of the fiber still existed, but was easier to loose because the strength was lost.

Comparative Example 4:

The γ-PGA fibers were immersed in 0.3 wt % sodium hypochlorite solution at a pH of 6-8 adjusted by 0.5 N phosphoric acid solution for 10 minutes. Then, it was found that the γ-PGA fiber had lost its configuration, became a hydrogel, and was easier to loose.

Comparative Example 5:

The γ-PGA fibers were immersed in 0.6 wt % sodium hypochlorite solution at a pH of 6-8 adjusted by 0.5 N phosphoric acid solution. However, upon contacting with the sodium hypochlorite solution, obvious disintegration of the structure occurred, and the γ-PGA fiber was completely decomposed in 30 min.

Comparative Example 6:

The γ-PGA fibers were immersed in 0.4 wt % sodium hypochlorite solution at a pH of 5.5 adjusted by 0.5 N phosphoric acid solution for 40 seconds and then taken out. The fibers were rinsed with distilled water, and then put aside to be dried. It was found that the structure of the γ-PGA fibers still existed, but was easier to loose because the strength was lost.

Comparative Example 7:

The γ-PGA fibers were immersed in 0.4 wt % sodium hypochlorite solution at a pH of 8.5 adjusted by 0.5 N phosphoric acid solution for 40 seconds and then taken out. The fibers were rinsed with distilled water, and then put aside to be dried. It was found that the structure of the γ-PGA fiber still existed, but was easier to loose because the strength was lost.

Antibacterial Test

Antibacterial activity tests for most of the antibacterial agents are evaluated by combating against a broad spectrum of organisms including Gram positive organisms and Gram negative organisms. The test bacteria solutions in the present invention include *Staphylococcus aureus* (BCRC Number 15211) and *Escherichia coli* (BCRC Number 11446). *Staphylococcus aureus* is a Gram positive bacterium and *Escherichia coli* is a Gram negative bacterium.

A. Culture of Bacteria Strain

A single colony of *Staphylococcus aureus* and that of *Escherichia coli* were picked up from a preserved agar medium respectively, then inoculated into a 15 mL centrifuge tube containing 2000 μL LB broth, and shaken for 10 min, to fully disperse the cells. Next, 10-fold serial dilutions of the formed stock bacteria solution with LB broth were performed, to obtain diluted bacteria solutions having different dilution factors ($10^{-1}$, $10^{-2}$, $10^{-3}$, $10^{-4}$ and $10^{-5}$). Then, 100 μL bacteria solutions of *Staphylococcus aureus* and *Escherichia coli* having different dilution factors were respectively inoculated onto different agar mediums and uniformly coated by a triangular glass rod. Subsequently, the agar mediums coated with bacteria solutions were placed and incubated for 14-24 hours in an incubator at 37° C. Then, the growth of the plated bacteria solutions having different dilution factors was observed, and the colony forming units (20-300 CFU) on agar were count. Through such a step, it was determined that the bacteria could normally grow in this environment or not. Then, according to a calculated CFUs of the agar medium, a suitable amount of stock bacteria solution was taken, and the content thereof was adjusted with sterilized water, to obtain a test solution having a concentration of $10^6$-$10^7$ CFU/mL.

B. Qualitative Antibacterial Test

100 μL test bacteria solutions (*Staphylococcus aureus* and *Escherichia coli*) having a concentration of $10^6$-$10^7$ CFU/mL were respectively inoculated onto different agar mediums, and uniformly coated by a triangular glass rod. Then, samples prepared in Embodiments 1-5 and Comparative Examples 1 and 2 were respectively cut into sheets, and the sheets covered on the agar mediums containing test bacteria solution above. Next, the agar mediums were placed and incubated for 14-24 hours in an incubator at 37° C. Then, the surfaces and surroundings of the samples were observed.

It was found through observation with naked eyes that no colony was formed on the surfaces and at surroundings of the samples of Embodiments 1-5, though the inhibition zone was unobvious, there was no colony formed on or below the sample. So it was concluded that they belong to the scope of contact inhibition, and thus would not release bacteria-inhibiting ingredient actively. In contrast, there were colonies formed on the surfaces and at surroundings of the samples of Comparative Examples 1 and 2, and it could be seen that the surface and the surroundings of the samples were covered with colonies.

Further antibacterial tests were not carried out with the treated fibers of Comparative Examples 3-7, because that the strength of the fibers' structure was insufficient, resulting in the structure of the fibers was more easily loosed or disintegrated and thus could not be shaped.

C. Quantitative Antibacterial Test

This test is evaluation carried out according to static contact AATCC 100 antibacterial standard. Samples of Embodiments 1-5 and Comparative Examples 1 and 2 were cut into a size of 2×2 cm², and respectively flatly attached on the bottom of 50 mL serum bottles. 20 μL original bacteria solutions of Staphylococcus aureus were inoculated on each sample, to respectively contact and culture the bacteria solution on the sample for 0 hour (contact for 0 hour means washing immediately) and 24 hours, and then the bacteria solutions were washed off with 20 mL Tween 80 solution, and respectively diluted by a factor of $10^{-1}$, $10^{-2}$, $10^{-3}$, $10^{-4}$, and $10^{-5}$. 100 μL of the above 5 serial dilutions were each placed on different solid mediums and then uniformly coated onto an agar. The plated agar was placed in an incubator at 37° C. After 14-24 hours of incubation, the growth of the bacteria solution washed off from the sample was observed, and colonies (20-300 CFU) on agar were counted and recorded.

Herein, the bactericidal capability of the sample is determined by the remaining colony number, and may be expressed by a formula below:

Antibacterial activity=$(A-B)/A \times 100\%$,

A is colony number obtained by contacting 20 μL of original bacteria solution with a sample for 5 minutes, washing with 20 mL Tween 80, collecting the washed-off bacteria solution, plating, and incubating for 14-24 hours. B is colony number obtained by contacting 20 μL of original bacteria solution with a sample for 24 hours, washing with 20 mL Tween 80, collecting the washed-off bacteria solution, plating, and incubating for 14-24 hours.

When B is far greater than A, it is indicated that the sample has no antibacterial ability. The antibacterial results are as shown in Table 1.

TABLE 1

Results of quantitative antibacterial test

| Sample Name | Colony Number (CFU/cm²) | | Bactericidal Rate (%) |
| --- | --- | --- | --- |
| | 5 mm (A) | 24 hours (B) | |
| Embodiment 1 | 3.22 × 10⁴ | 0 | >99.9 |
| Embodiment 2 | 3.11 × 10⁴ | 0 | >99.9 |
| Embodiment 3 | 4.05 × 10⁴ | 0 | >99.9 |
| Embodiment 4 | 5.87 × 10⁴ | 0 | >99.9 |
| Embodiment 5 | 5.24 × 10⁴ | 0 | >99.9 |
| Comparative Example 1 | 5.45 × 10⁴ | >10⁶ | 0 |
| Comparative Example 2 | 4.66 × 10⁴ | >10⁶ | 0 |

It can be known from the results of the quantitative antibacterial test that, antibacterial effect can be observed from all samples of Embodiments 1-5, and only the samples of Comparative Examples 1 and 2 have no antibacterial ability. Furthermore, it can be known from the results in Comparative Examples 1-7 that the immersing time is too short, the concentration of sodium hypochlorite is too low, the modification rate of the γ-PGA is quite low, and thus the antibacterial efficacy is insufficient. In the case that the immersing time is too long, or the concentration of sodium hypochlorite is too high, the fiber will gradually lose its mechanical strength in the immersing process, causing the structure disintegration, and thus the fiber cannot be further used. Therefore, the modified fiber must be prepared in the range of process parameter disclosed above, to have a sufficient antibacterial efficacy, and maintain the configuration of the γ-PGA fiber.

It should be understood that the descriptions above are only preferred embodiments of the present invention, and not intended to limit the scope of the present invention. Any equivalent changes or modifications made by any person skilled in the art without departing the spirits and scope of the present invention fall in the scope covered by the present invention.

What is claimed is:

1. A method for preparing a γ-polyglutamic acid (γ-PGA) fiber having antibacterial property and water absorptivity, comprising:
   immersing a γ-PGA fiber into a sodium hypochlorite solution, wherein a relation exists between an immersing time T and a concentration X of the sodium hypochlorite solution as shown in the following formula:

$10.2 \leq (T-64.55X^2+50X) \leq 15.2$, wherein X is 0.006-0.4 wt %.

2. The method of claim 1, wherein the γ-PGA fiber is prepared by cross-linking γ-PGA and then spinning.

3. The method of claim 1, wherein the pH value of the sodium hypochlorite solution is 6-8.

4. The method of claim 1, wherein the sodium hypochlorite solution further comprises a pH buffer agent.

5. The method of claim 4, wherein the pH buffer agent is a phosphoric acid solution, an ammonium chloride solution, an acetic acid solution, a sodium hydrogen phosphate solution, a disodium hydrogen phosphate solution, a benzoic acid solution, or a mixture thereof.

6. A polyglutamic acid (γ-PGA) fiber having antibacterial and water absorption properties, wherein the γ-PGA fiber is prepared by the method of claim 1.

7. A polyglutamic acid (γ-PGA) fabric having antibacterial and water absorption properties, wherein the γ-PGA fabric is prepared from the fiber of claim 6.

* * * * *

UNITED STATES PATENT AND TRADEMARK OFFICE
CERTIFICATE OF CORRECTION

| | | |
|---|---|---|
| PATENT NO. | : 8,771,571 B2 | Page 1 of 1 |
| APPLICATION NO. | : 13/051236 | |
| DATED | : July 8, 2014 | |
| INVENTOR(S) | : Huang et al. | |

It is certified that error appears in the above-identified patent and that said Letters Patent is hereby corrected as shown below:

On the Title Page: Item (30) please replace the foreign application priority number of "99133713 A" with "99133715 A"

Signed and Sealed this
Thirtieth Day of September, 2014

Michelle K. Lee
*Deputy Director of the United States Patent and Trademark Office*